(12) United States Patent
Papasakellariou et al.

(10) Patent No.: US 10,797,848 B2
(45) Date of Patent: *Oct. 6, 2020

(54) CONTROL AND DATA MULTIPLEXING IN COMMUNICATION SYSTEMS

(71) Applicant: Samsung Electronics Co., Ltd., Gyeonggi-do (KR)

(72) Inventors: Aris Papasakellariou, Houston, TX (US); Joon-Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,176

(22) Filed: Nov. 6, 2019

(65) Prior Publication Data

US 2020/0076561 A1    Mar. 5, 2020

Related U.S. Application Data

(63) Continuation of application No. 16/357,965, filed on Mar. 19, 2019, now Pat. No. 10,630,452, which is a
(Continued)

(51) Int. Cl.
*H04W 4/00* (2018.01)
*H04L 5/00* (2006.01)
(Continued)

(52) U.S. Cl.
CPC .......... *H04L 5/0055* (2013.01); *H04L 1/0003* (2013.01); *H04L 1/0026* (2013.01);
(Continued)

(58) Field of Classification Search
CPC ... H04L 5/0055; H04L 1/0003; H04L 5/0057; H04L 1/0026; H04L 1/0028;
(Continued)

(56) References Cited

U.S. PATENT DOCUMENTS 5,828,677 A   10/1998   Sayeed et al.
6,178,448 B1   1/2001   Gray et al.
(Continued)

FOREIGN PATENT DOCUMENTS

CN    1650547    8/2005
CN    1669262    9/2005
(Continued)

OTHER PUBLICATIONS

NEC Group, Multiplexing of uplink data-non-associated control with data, Aug. 20-27, 2007. (From Applicant's IDS filed on Nov. 25, 2019) (Year: 2007).*
(Continued)

*Primary Examiner* — Mang Hang Yeung
(74) *Attorney, Agent, or Firm* — The Farrell Law Firm, P.C.

(57) ABSTRACT

Disclosed is a method performed by a user equipment (UE) in a wireless communication system, including identifying first offset information and second offset information, determining a size of uplink data for the UE, and transmitting, to a base station in the wireless communication system, the uplink data with at least one of acknowledgement/non-acknowledgment (ACK/NACK) information and channel quality indicator (CQI) information on a physical uplink shared channel (PUSCH), wherein a number of symbols for the ACK/NACK information is determined based on the first offset information and the size of the uplink data, and wherein a number of symbols for the CQI information is determined based on the second offset information and the size of the uplink data.

8 Claims, 6 Drawing Sheets

Related U.S. Application Data continuation of application No. 15/913,115, filed on Mar. 6, 2018, now Pat. No. 10,237,044, which is a continuation of application No. 15/351,022, filed on Nov. 14, 2016, now Pat. No. 9,912,460, which is a continuation of application No. 14/570,595, filed on Dec. 15, 2014, now Pat. No. 9,497,009, which is a continuation of application No. 13/453,647, filed on Apr. 23, 2012, now Pat. No. 8,995,294, which is a continuation of application No. 12/365,608, filed on Feb. 4, 2009, now Pat. No. 8,165,081.

(60) Provisional application No. 61/025,925, filed on Feb. 4, 2008.

(51) Int. Cl.
| | | |
|---|---|---|
| *H04L 1/00* | (2006.01) | |
| *H04L 1/16* | (2006.01) | |
| *H04W 52/48* | (2009.01) | |
| *H04W 72/04* | (2009.01) | |
| *H04W 52/14* | (2009.01) | |

(52) U.S. Cl.
CPC .......... *H04L 1/0028* (2013.01); *H04L 1/1607* (2013.01); *H04L 5/0053* (2013.01); *H04L 5/0057* (2013.01); *H04W 52/48* (2013.01); *H04W 72/0413* (2013.01); *H04L 5/0007* (2013.01); *H04W 52/146* (2013.01); *H04W 72/04* (2013.01); *Y02D 70/00* (2018.01)

(58) Field of Classification Search
CPC ... H04L 1/1607; H04L 5/0053; H04L 5/0007; H04W 72/0413; H04W 52/48; H04W 52/146; H04W 72/04; H04W 52/04; Y02D 70/00
USPC .......................................................... 370/329
See application file for complete search history.

(56) References Cited

U.S. PATENT DOCUMENTS

| | | |
|---|---|---|
| 6,747,964 B1 | 6/2004 | Bender |
| 2002/0115443 A1 | 8/2002 | Freiberg et al. |
| 2003/0123598 A1 | 7/2003 | Gollamudi et al. |
| 2004/0229641 A1 | 11/2004 | Takagi |
| 2004/0248606 A1 | 12/2004 | Suzuki et al. |
| 2005/0025254 A1* | 2/2005 | Awad .................... H04L 1/0009 375/295 |
| 2005/0213505 A1 | 9/2005 | Iochi et al. |
| 2005/0238053 A1 | 10/2005 | Iochi et al. |
| 2006/0092887 A1 | 5/2006 | Iacono et al. |
| 2006/0211441 A1 | 9/2006 | Mese et al. |
| 2006/0221885 A1 | 10/2006 | Nagaraj |
| 2007/0025324 A1 | 2/2007 | Kim et al. |
| 2007/0183520 A1 | 8/2007 | Kim et al. |
| 2007/0195740 A1* | 8/2007 | Bhushan ............. H04B 7/2656 370/335 |
| 2008/0013605 A1 | 1/2008 | Lin |
| 2008/0107193 A1 | 5/2008 | Erceg |
| 2008/0130605 A1* | 6/2008 | Song .................... H04W 48/12 370/338 |
| 2008/0298482 A1 | 12/2008 | Rensburg |
| 2009/0022135 A1* | 1/2009 | Papasakellariou ....... H04J 11/00 370/344 |
| 2009/0097466 A1* | 4/2009 | Lee ....................... H04L 5/0053 370/344 |
| 2009/0181687 A1* | 7/2009 | Tiirola .................. H04L 5/0048 455/450 |
| 2016/0330727 A1 | 11/2016 | Imamura et al. |

FOREIGN PATENT DOCUMENTS

| | | |
|---|---|---|
| CN | 1879325 | 12/2006 |
| EP | 1 830 489 | 9/2007 |
| JP | 2007-511975 | 5/2007 |
| KR | 1020040050756 | 6/2004 |
| KR | 1020040064865 | 7/2004 |
| KR | 1020060025139 | 3/2006 |
| RU | 2003110572 | 8/2004 |
| WO | WO 01/56190 | 8/2001 |
| WO | WO 2007/091235 | 8/2007 |
| WO | WO 2007/136002 | 11/2007 |

OTHER PUBLICATIONS

Qualcomm Europe, Rate Matching Details for Control and Data Multiplexing, Aug. 20-24, 2007. (From Applicant's IDS filed on Nov. 25, 2019) (Year: 2007).*
Motorola, UL L1/L2 Control Signals with Data: Multiplexing Detail, Aug. 20-24, 2007. (From Applicant's IDS filed on Nov. 25, 2019) (Year: 2007).*
Qualcomm Europe, "Rate Matching Details for Control and Data Multiplexing", R1-073269, 3GPP TSG-RAN WG1 #50, Aug. 20-24, 2007.
Panasonic, "Mapping Position of Control Channel for Uplink SC-FDMA", R1-051395, TSG-RAN WG1 #43, Nov. 7-11, 2005.
Nokia Siemens Networks, "ACK/NACK Modulation with UL Data", R1-073657, 3GPP TSG RAN WG1 Meeting #50, Aug. 20-24, 2007.
NEC Group, NTT DoCoMo, "Multiplexing of Uplink Data-Non-Associated Control Signal with Data", 3GPP TSG RAN WG1 Meeting #50, R1-073463, Aug. 20, 2007.
Motorola, "UL L1/L2 Control Signals with Data: Multiplexing Detail", R1-073388, 3GPP TSG RAN1#50, Aug. 20, 2007.
Motorola, "Mulitiplexing of Uplink Control Signaling with Data", R1-070777, 3GPP TSG RAN1 #48, Feb. 12-16, 2007.
Korean Office Action dated Dec. 8, 2014 issued in counterpart application No. 10-2009-0009065.
Chinese Office Action dated Mar. 12, 2015 issued in counterpart application No. 201210209853.7.
Ad hoc chairman, "Notes from Uplink Control Signaling Discussions", R1-073842, TSG-RAN WG1 #50, Aug. 20-24, 2007, 1 page.
Qualcomm Europe, "Details of Control and Data Multiplexing in PUSCH", R1-080483, 3GPP TSG-RAN WG1 #51bis, Jan. 14-18, 2008, 5 pages.
Alcatel-Lucent, "Clarification on Uplink Power Control to Support UL ICIC", R1-07-4987, 3GPP TSG RAN WG1 #51 Meeting, Nov. 5-9, 2007, 4 pages.
Brazilian Office Action dated Aug. 29, 2019 issued in counterpart application No. PI0908040-6, 7 pages.

* cited by examiner

US 10,797,848 B2

CONTROL AND DATA MULTIPLEXING IN COMMUNICATION SYSTEMS

PRIORITY

This application is a Continuation of U.S. application Ser. No. 16/357,965, filed on Mar. 19, 2019, which is a continuation of U.S. application Ser. No. 15/913,115, filed on Mar. 6, 2018, now U.S. Pat. No. 10,237,044, issued on Mar. 19, 2019, which in a Continuation Application of U.S. application Ser. No. 15/351,022, filed on Nov. 14, 2016, now U.S. Pat. No. 9,912,460, issued on Mar. 6, 2018, which is a Continuation Application of U.S. application Ser. No. 14/570,595, filed on Dec. 15, 2014, now U.S. Pat. No. 9,497,009, issued on Nov. 15, 2016, which is a Continuation Application of U.S. application Ser. No. 13/453,647, filed on Apr. 23, 2012, now U.S. Pat. No. 8,995,294, issued on Mar. 31, 2015, which is a Continuation Application of U.S. patent application Ser. No. 12/365,608, filed on Feb. 4, 2009, now U.S. Pat. No. 8,165,081, issued on Apr. 24, 2012, which claims priority under 35 U.S.C. § 119 to U.S. Provisional Application No. 61/025,925, filed on Feb. 4, 2008, the contents of each of which are incorporated herein by reference.

BACKGROUND OF THE INVENTION

1. Field of the Invention

The present invention is directed, in general, to wireless communication systems and, more specifically, to multiplexing control and data information in Single-Carrier Frequency Division Multiple Access (SC-FDMA) communication systems.

2. Description of the Related Art

The present invention considers the transmission of positive or negative acknowledgement signals (ACK or NAK, respectively), channel quality indicator (CQI) signals, precoding matrix indicator (PMI) signals, and rank indicator (RI) signals together with data information signals in a SC-FDMA communications system and is further considered in the development of the $3^{rd}$ Generation Partnership Project (3GPP) Evolved Universal Terrestrial Radio Access (E-UTRA) Long Term Evolution (LTE). The invention assumes the uplink (UL) communication corresponding to the signal transmission from mobile user equipments (UEs) to, a serving base station (Node B). A UE, also commonly referred to as a terminal or a mobile station, may be fixed or mobile and may be a wireless device, a cellular phone, a personal computer device, a wireless modem card, etc. A Node B is generally a fixed station and may also be referred to as a base transceiver system (BTS), an access point, or other terminology. Any combination of ACK/NAK, CQI, PMI, and RI signals may also be jointly referred to as uplink control information (UCI) signals.

The ACK or NAK signal is associated with the application of hybrid automatic repeat request (HARQ) and is in response to the correct or incorrect, respectively, data packet reception in the downlink (DL) of the communication system, which corresponds to signal transmission from the serving Node B to a UE. The CQI signal transmitted from a reference UE is intended to inform the serving Node B of the channel conditions the UE experiences for signal reception in the DL, enabling the Node B to perform channel-dependent scheduling of DL data packets. The PMI/RI signals transmitted from a reference UE are intended to inform the serving Node B how to combine the transmission of a signal to the UE from multiple Node B antennas in accordance with the multiple-input multiple-output (MIMO) principle. Any one of the possible combinations of ACK/NAK, CQI, PMI, and RI signals may be transmitted by a UE in the same transmission time interval (TTI) with data transmission or in a separate TTI without data transmission. The present invention considers the former case.

The UEs are assumed to transmit UCI and/or data signals over a TTI corresponding to a sub-frame. The physical channel carrying the data transmission and, if any, the UCI transmission is referred to as a physical uplink shared channel (PUSCH).

FIG. 1 illustrates a sub-frame structure assumed in the exemplary embodiment of the invention. The sub-frame 110 includes two slots (120a, 120b). Each slot 120 further includes seven symbols, for example, and each symbol 130 further includes of a cyclic prefix (CP) (not shown) for mitigating interference due to channel propagation effects. The signal transmission in the two slots 120a and 120b may be in the same part, or it may be at two different parts of an operating bandwidth (BW). Furthermore, the middle symbol in each slot carries transmission of reference signals (RS) 140, also known as pilot signals, which are used for several purposes, such as providing channel estimation for coherent demodulation of the received signal, for example. The transmission BW includes frequency resource units, which will be referred to as resource blocks (RBs). In an exemplary embodiment, each RB includes 12 sub-carriers, and UEs are allocated a multiple N of consecutive RBs 150 for PUSCH transmission. A sub-carrier may also be referred to as a resource element (RE).

An exemplary block diagram of transmitter functions for SC-FDMA signaling is illustrated in FIG. 2. Coded CQI bits and/or PMI bits 205 and coded data bits 210 are multiplexed 220. If ACK/NAK bits also need to be multiplexed, data bits are punctured to accommodate ACK/NAK bits (230). The Discrete Fourier Transform (DFT) of the combined data bits and UCI bits is then obtained (240), the sub-carriers 250 corresponding to the assigned transmission BW are selected (255), the Inverse Fast Fourier Transform (IFFT) is performed 260, and finally the cyclic prefix (CP) 270 and filtering 280 are applied to the transmitted signal 290. For brevity, additional transmitter circuitry, such as digital-to-analog converter, analog filters, amplifiers, and transmitter antennas are not illustrated. Also, the encoding process for the data bits and the CQI and/or PMI bits, as well as the modulation process for all transmitted bits, are omitted for brevity.

At the receiver, reverse (complementary) transmitter operations are performed as conceptually illustrated in FIG. 3 where the reverse operations of those illustrated in FIG. 2 are performed. After an antenna receives the radio-frequency (RF) analog signal and after further processing units (such as filters, amplifiers, frequency down-converters, and analog-to-digital converters), which are not shown for brevity, the digital received signal 310 passes through a time windowing unit 320, and the CP is removed (330). Subsequently, the receiver unit applies an FFT 340, selects the sub-carriers 350 used by the transmitter (355), applies an Inverse DFT (IDFT) 360, extracts the ACK/NAK bits and places respective erasures for the data bits (370), and de-multiplexes (380) the data bits 390 and CQI/PMI bits 395. As for the transmitter, well known receiver functionalities such as channel estimation, demodulation, and decoding are not shown for brevity and are not considered material for purposes of explanation of the present invention.

PUSCH transmission from a UE may be configured by the Node B through the transmission of an UL scheduling assignment (SA) or through higher layer signaling to the reference UE. In either case, in order to limit the overhead associated with the setup of the PUSCH transmission and to maintain the same size of the UL SA or the higher layer signaling, regardless of the UCI presence in the PUSCH, only parameters associated with data transmission are assumed to be informed by the Node B to the reference UE. Parameters associated with potential UCI transmission, namely the resources allocated to UCI transmission, in the PUSCH are not specified.

UCI bits usually require better reception reliability than data bits. This is primarily because HARQ typically applies only to data and not to UCI. Additionally, UCI bits may require different reception reliability depending on their type. For example, the target bit error rate (BER) for ACK/NAK bits is typically much lower than that of CQI/PMI bits as, due to their small number, the ACK/NAK bits are protected through repetition coding while more powerful coding methods are applied to CQI/PMI bits. Moreover, erroneous reception of ACK/NAK bits has more detrimental consequences to the overall quality and efficiency of the communication than erroneous reception of CQI/PMI bits.

Therefore, there is a need to determine the parameters for the transmission of UCI signals in the PUSCH based on the parameters for the transmission of data signals in the PUSCH. Further, there is a need to provide different reception reliability for the different types of UCI signals in the PUSCH. Additionally, there is a need to minimize the signaling overhead for determining the parameters for the transmission of different types of UCI signals in the PUSCH.

SUMMARY OF THE INVENTION

Accordingly, the present invention has been designed to solve the above-mentioned problems occurring in the prior art, and embodiments of the invention provide an apparatus and a method for allocating resources to the transmission of control signals from a user equipment in a sub-frame that also conveys transmission of data signals.

In one aspect of the present invention, a method performed by a user equipment (UE) in a wireless communication system includes identifying first offset information and second offset information, determining a size of uplink data for the UE, and transmitting, to a base station in the wireless communication system, the uplink data with at least one of acknowledgement/non-acknowledgment (ACK/NACK) information and channel quality indicator (CQI) information on a physical uplink shared channel (PUSCH), wherein a number of symbols for the ACK/NACK information is determined based on the first offset information and the size of the uplink data, and wherein a number of symbols for the CQI information is determined based on the second offset information and the size of the uplink data.

In another aspect of the present invention, a method performed by a base station in a wireless communication system includes identifying first offset information and second offset information, determining a size of uplink data for a UE in the wireless communication system, and receiving, from the UE, the uplink data with at least one of ACK/NACK information and CQI information on a PUSCH, wherein a number of symbols for the ACK/NACK information is determined based on the first offset information and the size of the uplink data, and wherein a number of symbols for the CQI information is determined based on the second offset information and the size of the uplink data.

In another aspect of the present invention, an apparatus in a UE in a wireless communication system includes a hardware controller configured to identify first offset information and second offset information, and determine a size of uplink data for the UE, and a transmitter configured to transmit, to a base station in the wireless communication system, the uplink data with at least one of ACK/NACK information and CQI information on a PUSCH, wherein a number of symbols for the ACK/NACK information is determined based on the first offset information and the size of the uplink data, and wherein a number of symbols for the CQI information is determined based on the second offset information and the size of the uplink data.

In another aspect of the present invention, an apparatus in a base station in a wireless communication system includes a hardware controller configured to identify first offset information and second offset information, and determine a size of uplink data for a UE in the wireless communication system, and a receiver configured to receive from the UE, the uplink data with at least one of ACK/NACK information and CQI information on a PUSCH, wherein a number of symbols for the ACK/NACK information is determined based on the first offset information and the size of the uplink data, and wherein a number of symbols for the CQI information is determined based on the second offset information and the size of the uplink data.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
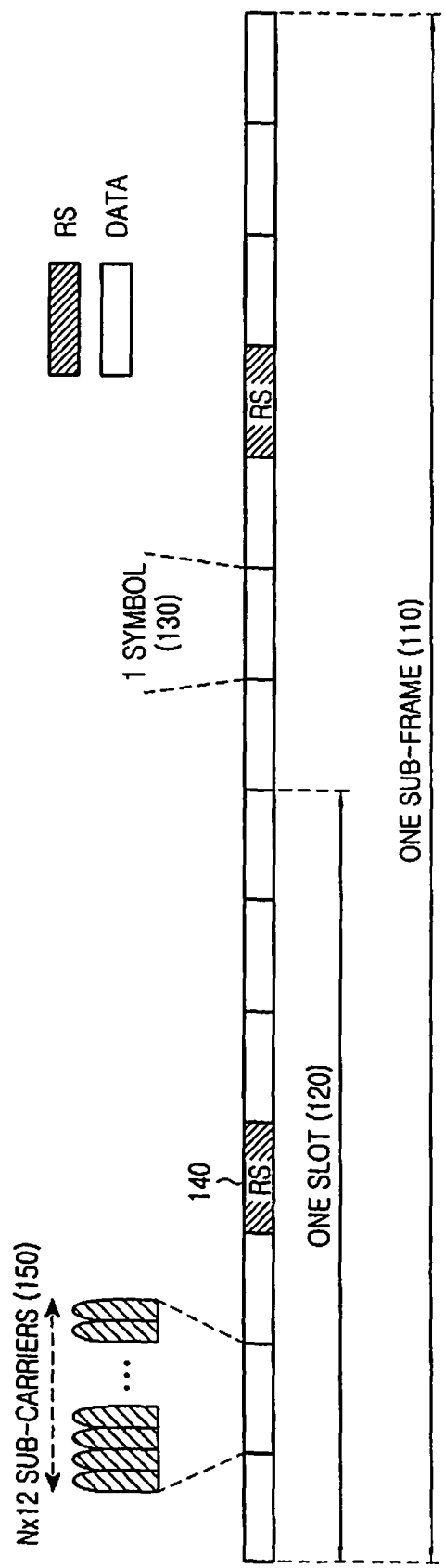
FIG. 1 is a block diagram illustrating an exemplary sub-frame structure for the SC-FDMA communication system.
Figure 2:
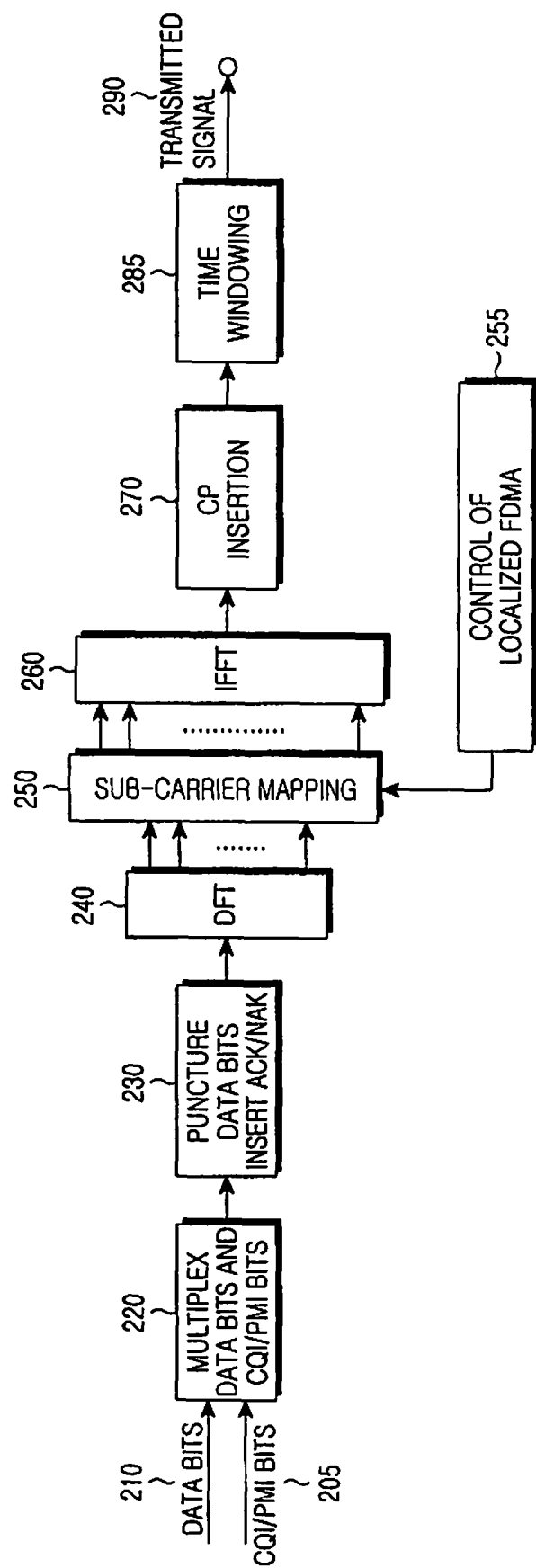
FIG. 2 is a block diagram illustrating an exemplary SC-FDMA transmitter for multiplexing data bits, CQI/PMI bits, and ACK/NAK bits in a transmission sub-frame.
Figure 3:
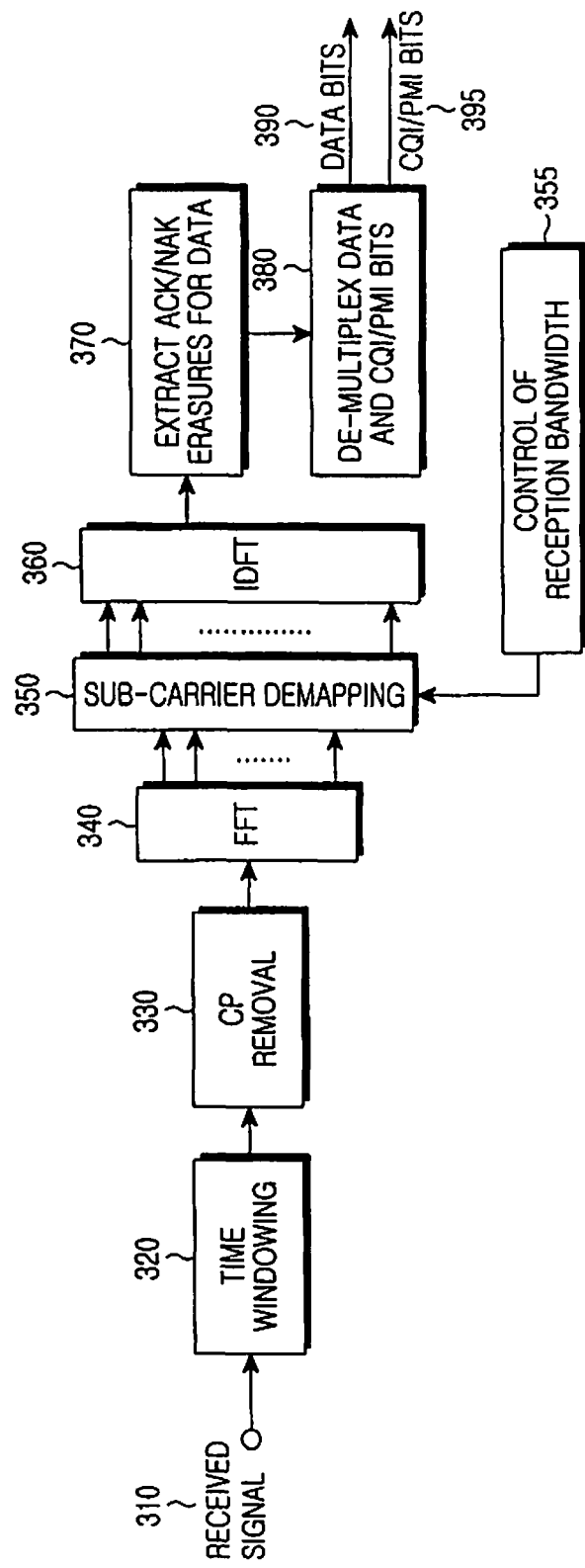
FIG. 3 is a block diagram illustrating an exemplary SC-FDMA receiver, for de-multiplexing data bits, CQI/PMI bits, and ACK/NAK bits in a reception sub-frame.

The present invention now will be described more fully hereinafter with reference to the accompanying drawings and tables. This invention may, however, be embodied in many different forms and should not be construed as limited to the embodiments set forth herein. Rather, these embodiments are provided so that this disclosure will be thorough and complete, and will fully convey the scope of the invention to those skilled in the art.

While the invention is explained in the context of a SC-FDMA communication system, it also applies to other communication systems, such as all FDM systems in general, and to OFDMA, OFDM, FDMA, DFT-spread OFDM, DFT-spread OFDMA, single-carrier OFDMA (SC-OFDMA), and single-carrier OFDM, in particular.

The system and method of the exemplary embodiments of the present invention solve problems related to the need for determining resources for transmission of control signals occurring together with the transmission of a data signal in the same physical channel without explicitly signaling these resources. The reception reliability of control signals is largely decoupled from the reception reliability of data signals. Moreover, the reception reliability among different types of control signals is also largely decoupled and different amounts of resources may be allocated to different types of control signals.

The determination of the resources, or equivalently of the modulation and coding scheme (MCS), for the CQI/PMI signal transmission in the PUSCH is first considered. For brevity, unless explicitly mentioned otherwise, all statements for the CQI will also apply to the PMI.

The CQI MCS is assumed to not be explicitly indicated to a UE. This includes both cases where the PUSCH transmission is associated with a SA the Node B transmits to the reference UE and is semi-statically configured through higher layer signaling. Instead, the CQI MCS, which for a given number of CQI information bits (CQI payload) simply corresponds to the number of coded CQI symbols, is determined based on the MCS assigned for the data transmission in the PUSCH.

An exemplary set of 16 MCS is listed in Table 1 in increasing order of spectral efficiency. The MCS for the data transmission is explicitly configured either dynamically through a SA or semi-statically through higher layer signaling as previously discussed.

TABLE 1

Exemplary Set of 16 MCS for Data Transmission.

| MCS Number | Modulation | Coding Rate |
| --- | --- | --- |
| MCS1 | QPSK | 1/8 |
| MCS2 | QPSK | 1/5 |
| MCS3 | QPSK | 1/4 |
| MCS4 | QPSK | 1/3 |
| MCS5 | QPSK | 2/5 |
| MCS6 | QPSK | 1/2 |
| MCS7 | QPSK | 3/5 |
| MCS8 | QAM16 | 2/5 |
| MCS9 | QAM16 | 1/2 |
| MCS10 | QAM16 | 3/5 |
| MCS11 | QAM16 | 2/3 |
| MCS12 | QAM64 | 1/2 |
| MCS13 | QAM64 | 3/5 |
| MCS14 | QAM64 | 2/3 |
| MCS15 | QAM64 | 3/4 |
| MCS16 | QAM64 | 5/6 |

Similar principles apply for the ACK/NAK (or RI) transmission. Although at most 2 ACK/NAK information bits are assumed to be transmitted, the equivalent issue to the coding rate is the number of sub-carriers (REs) used for the ACK/NAK transmission (repetition coding of the 1-bit or 2-bit ACK/NAK transmission). This number of REs is also assumed to be determined from the MCS of the data transmission in the PUSCH. Therefore, for the ACK/NAK transmission, the MCS simply corresponds to the number of REs over which the 1-bit or 2-bit ACK/NAK transmission is repeated. The CQI and ACK/NAK transmissions need not both occur in the PUSCH during the same sub-frame.

An exemplary approach for determining the CQI MCS and/or the number of ACK/NAK repetitions from the data MCS in the PUSCH is to use a table linking each possible CQI MCS and/or the number of ACK/NAK repetitions to a data MCS. Such a table is needed because the CQI payload, coding rate, and target block error rate (BLER) are typically different than the corresponding ones for the data. The same holds for the ACK/NAK transmission.

For example, the data may be turbo encoded and have a target BLER around 20% while the CQI may apply convolutional encoding and have a target BLER around 5%. Therefore, the data and CQI cannot be typically transmitted with the same MCS. However, assuming a fixed relation between the data target BLER and the CQI target BLER, the number of CQI coded symbols (CQI MCS) may be determined from the data payload and MCS, and the CQI payload. The number of ACK/NAK repetitions may be determined in a similar manner given a target ACK/NAK BER.

To create a table linking the data MCS to the CQI MCS and the number of ACK/NAK repetitions based on the exemplary approach, reference BLER and BER operating points are needed. The nominal CQI MCS and number of ACK/NAK repetitions may be defined to achieve respective reference BLER and BER relative to the data MCS corresponding to a reference data BLER. Although, for brevity, a single table is subsequently discussed, the CQI MCS and the number of ACK/NAK repetitions may be linked to the data MCS through different tables or a linking equation.

An exemplary outline of the above process is described below:

Select target values for the data BLER (e.g., 20%), for the CQI BLER (e.g., 5%), and for the ACK/NAK BER (e.g., 0.1%) and select a set of signal-to-interference ratio (SINR) operating points.

For each SINR point, determine the highest data MCS achieving BLER equal to or smaller than the data target BLER, the highest CQI MCS achieving BLER equal to or smaller than the CQI target BLER, and the smallest number of ACK/NAK repetitions achieving ACK/NAK BER equal to or smaller than the ACK/NAK target BER.

For each SINR operating point, link the above highest data MCS to the above highest CQI MCS and the above smallest number of ACK/NAK repetitions. 1-bit ACK/NAK transmission, for example, requires SINR that is 3 decibel (dB) smaller than the SINR for 2-bit ACK/NAK transmission for the same target BER.

A reference transmitter/channel/receiver setup may be assumed such as, for example, one UE transmitter antenna, two uncorrelated Node B receiver antennas, a reference propagation channel, together with a reference data payload and CQI payload.

Table 2 describes the link between the data MCS and the CQI MCS or the number of ACK/NAK repetitions. Using the example of Table 1, sixteen (16) CQI MCS and sixteen (16) ACK/NAK repetitions may be defined (twice as many repetitions apply for 2-bit ACK/NAK transmission relative to 1-bit ACK/NAK transmission).

TABLE 2

Link of Data MCS to CQI MCS and to ACK/NAK Repetitions.

| SINR Point | Data MCS | CQI MCS | ACK/NAK Repetitions |
| --- | --- | --- | --- |
| 1 | $MCS_{D1}$ | $MCS_{C1}$ | $A_1$ |
| 2 | $MCS_{D2}$ | $MCS_{C1}$ | $A_2$ |
| ... | ... | ... | ... |
| 16 | $MCS_{D16}$ | $MCS_{C16}$ | $A_{16}$ |

Strictly linking the CQI coded symbols (MCS) or the number of ACK/NAK repetitions with the data MCS forces a corresponding link between CQI BLER, the ACK/NAK BER, and data BLER, which is generally not desirable. For example, the Node B scheduler may choose a data target BLER from 10% to 40%, depending on the application and/or the system conditions (latency, system load, etc.), but this should not impact the CQI BLER or the ACK/NAK BER, which should be largely independent of such considerations. In order to effectively decouple the CQI target BLER and the ACK/NAK target BER from the data target BLER, an offset relative to the nominal CQI MCS and an offset relative to the nominal ACK/NAK repetitions associated with a specific data MCS may be semi-statically configured for the CQI transmission and the ACK/NAK transmission in the PUSCH.

As the Node B scheduler may, for example, choose a data target BLER larger than 20% for a certain UE, the CQI target BLER may still remain at the desired exemplary value of 5% by using an offset to specify a lower CQI MCS (i.e., lower coding rate resulting in more CQI coded symbols) than the one resulting from the link to the data MCS. Respective examples apply for other UCI signals.

As this variability in the target BLERs relative to the reference ones is not expected to be very large, a few bits may be used to specify the CQI MCS offset relative to the CQI MCS obtained from the link to the data MCS. For example, using 2 bits to specify the CQI MCS offset, out of the corresponding 4 offset values for the CQI MCS, one may indicate a higher MCS, two may indicate two smaller MCS, and one may indicate the nominal MCS (obtained from the link to the data MCS). The same applies for the number of ACK/NAK repetitions. One offset value may indicate the next lower number of possible repetitions, one may indicate the nominal number of repetitions (obtained from the link to the data MCS), and the other two may indicate the next two higher numbers of repetitions.

Figure 4:
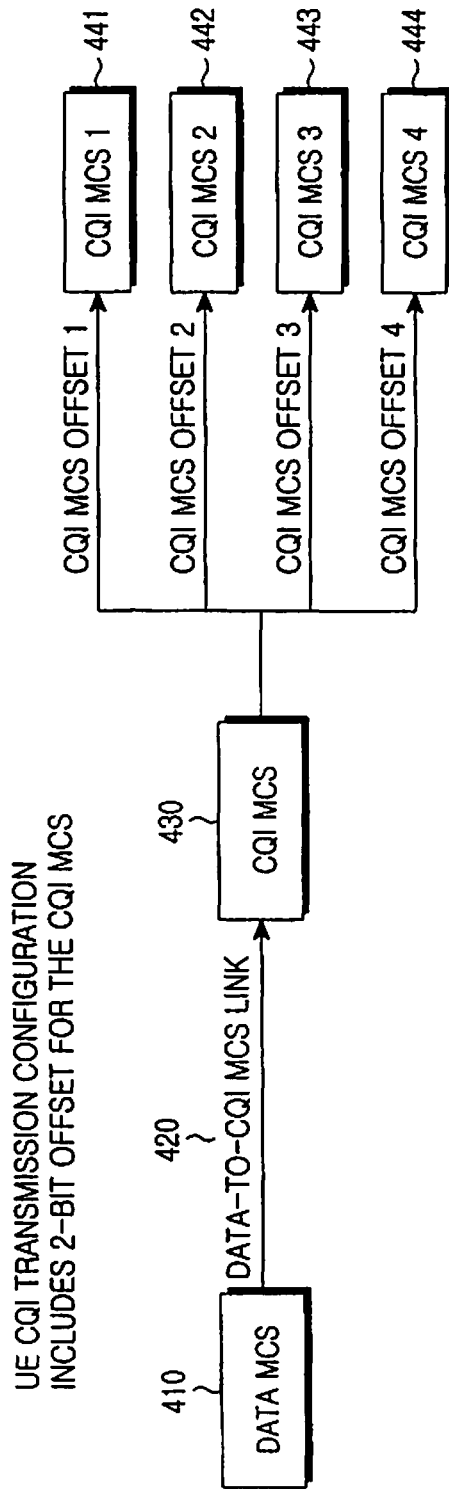
FIG. 4 is a block diagram illustrating decoupling of CQI MCS from data MCS in accordance with an exemplary embodiment of the present invention.

FIG. 4 illustrates an exemplary embodiment of the present invention for the CQI, but the same principle may be extended to the ACK/NAK or RI in a straightforward manner, the description of which is omitted for brevity. The UE is either dynamically (through an SA) or semi-statically (through higher layers) assigned the MCS it should use for the data transmission in the PUSCH 410. Then, using the link to the data MCS 420, either through a Table or a linking equation, the UE determines the nominal MCS for the CQI transmission 430 in the PUSCH. Subsequently, using the CQI MCS offset the UE was assigned as part of the configuration parameters for the CQI transmission (through higher layer signaling), the UE adjusts the CQI MCS relative to the nominal CQI MCS based on the indication from the CQI MCS offset. For the previous example of an offset specified by 2 bits, the UE may select one of the four MCS indicated as MCS1 441, MCS2 442, MCS3 443, and MCS4 444.

Figure 5:
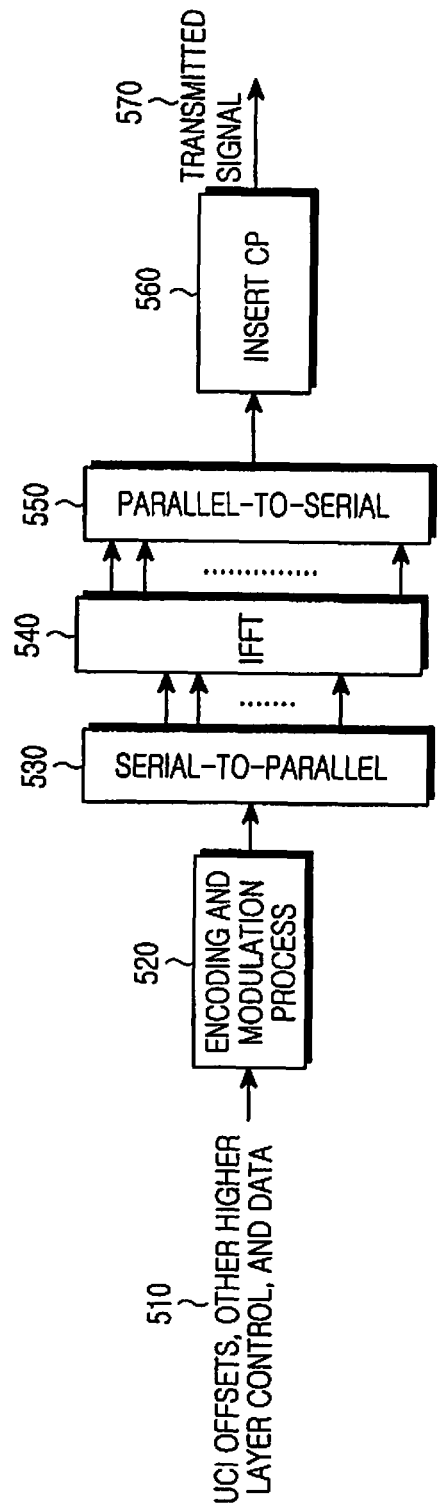
FIG. 5 is a block diagram illustrating an exemplary embodiment of a base station transmitter in accordance with the present invention.

FIG. 5 illustrates an exemplary block diagram of a Node B transmitter in accordance with the present invention. In the exemplary embodiment, OFDM transmission method is used for purposes of example and explanation only. The UCI offsets as described above are determined in a computing unit 510 and may be coupled together with other higher layer control signaling and data. The UCI offset bits and any other combined bits are encoded and modulated in encoder/modulator unit 520. A serial-to-parallel conversion is applied to the encoded and modulated symbols in a serial-to-parallel converter 530. IFFT is performed in an IFFT unit 540, a parallel-to-serial conversion is applied in a parallel-to-serial converter 550, and CP is inserted in CP unit 560 before the signal is transmitted. For brevity, additional transmitter circuitry, such as digital-to-analog converter, analog filters, amplifiers, and transmitter antennas are not illustrated.

Figure 6:
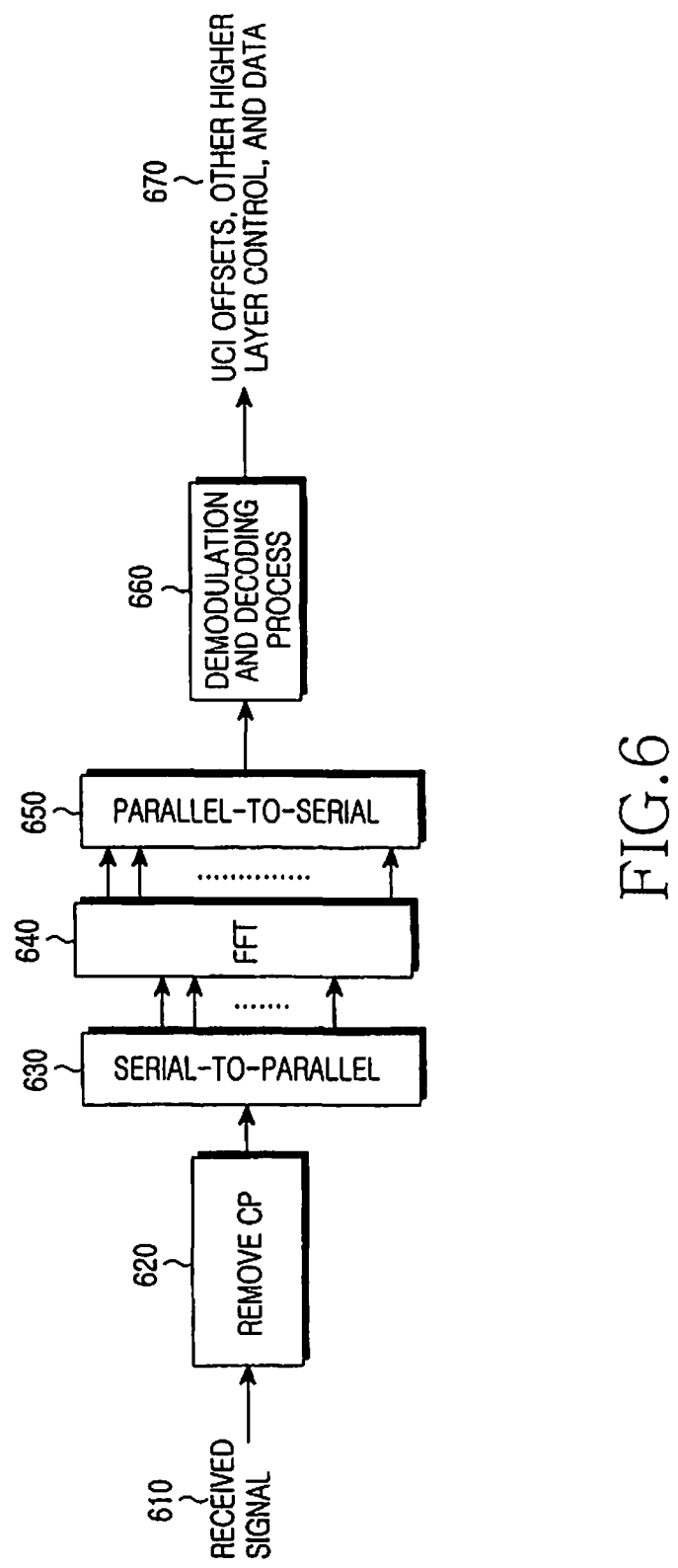
FIG. 6 is a block diagram illustrating an exemplary UE receiver in accordance with the present invention.

FIG. 6 illustrates an exemplary block diagram of a UE receiver in accordance with the present invention. In the exemplary embodiment, OFDM transmission method is used for purposes of example and explanation only. The Radio-Frequency (RF) analog signals transmitted from a Node B is received and processed by a pre-processing unit 610, which may include additional processing circuits (such as filters, amplifiers, frequency down-converters, analog-to-digital converters, etc.) not shown for brevity. The digital signal resulting from the pre-processing unit 610 has the CP removed in CP unit 620, a serial-to-parallel conversion is applied in a serial-to-parallel converter 630, and FFT is performed in a FFT unit 640. A parallel-to-serial conversion is applied to the converted symbols in a parallel-to-serial converter 650, and the symbols are then demodulated and decoded in decoder/demodulator 660 to obtain the UCI offsets and any other higher layer control signaling and data in a computing unit 670.

The same transmitter and receiver structure may be used for the UL SA conveying the MCS and other scheduling information for the associated PUSCH transmission.

In summary, a UE determines the CQI MCS and/or the number of ACK/NAK repetitions in the PUSCH from its assigned data MCS in the PUSCH as follows:

The nominal CQI MCS and the nominal number of ACK/NAK repetitions in the PUSCH are directly linked to the data MCS in the PUSCH.

The data target BLER, the CQI target BLER, and the ACK/NAK BER are decoupled within a range determined by the range of an offset parameter. During the configuration of UE transmission parameters, a UE is also configured an offset for the MCS it should use for the CQI transmission in the PUSCH and an offset for the number of repetitions it should use for the ACK/NAK transmission in the PUSCH relative to the nominal CQI MCS and the nominal number of ACK/NAK repetitions determined by the link to the data MCS.

Similar to the scheduler choosing the MCS of the initial data transmission to maximize throughput when relying on HARQ process, the MCS of possible retransmissions may also be chosen accordingly and rely on the fact that previous data transmissions have occurred. Therefore, for adaptive retransmissions, the scheduler may choose a different MCS and target data BLER depending on the redundancy version of the HARQ process. An offset relative to the nominal MCS may also be configured for the CQI transmission and/or the ACK/NAK. transmission during data retransmissions in the PUSCH. As the number of retransmissions is typically small, only a small number of such additional offsets may be configured for retransmissions.

If the CQI target BLER is different than the PMI (RI) target BLER, to avoid having a separate link for the PMI (RI) MCS, the PMI (RI) MCS may be configured with an offset relative to the CQI MCS. This offset may be determined from the difference between the CQI and PMI (RI) target BLERs. If the CQI target BLER is lower (or higher) than the PMI (RI) one, this offset may point to a higher (or lower) MCS for the PMI (RI) transmission.

While the present invention has been shown and described with reference to certain embodiments thereof, it will be understood by those skilled in the art that various changes in form and details may be made therein without departing from the spirit and scope of the invention as defined by the appended claims.

What is claimed is:

1. A method performed by a user equipment (UE) in a wireless communication system, the method comprising:
   identifying first offset information and second offset information;
   determining a size of uplink data for the UE; and
   transmitting, to a base station in the wireless communication system, the uplink data with at least one of acknowledgement/non-acknowledgment (ACK/NACK) information and channel quality indicator (CQI) information on a physical uplink shared channel (PUSCH),
   wherein a number of symbols for the ACK/NACK information is determined based on the first offset information and the size of the uplink data, and
   wherein a number of symbols for the CQI information is determined based on the second offset information and the size of the uplink data.

2. The method of claim 1, wherein the size of the uplink data is determined based on a modulation and coding scheme (MCS) assigned by the base station.

3. A method performed by a base station in a wireless communication system, the method comprising:
   identifying first offset information and second offset information;
   determining a size of uplink data for a user equipment (UE) in the wireless communication system; and
   receiving, from the UE, the uplink data with at least one of acknowledgement/non-acknowledgement (ACK/NACK) information and channel quality indicator (CQI) information on a physical uplink shared channel (PUSCH),
   wherein a number of symbols for the ACK/NACK information is determined based on the first offset information and the size of the uplink data, and
   wherein a number of symbols for the CQI information is determined based on the second offset information and the size of the uplink data.

4. The method of claim 3, wherein the size of the uplink data is determined based on a modulation and coding scheme (MCS) assigned to the UE.

5. An apparatus in a user equipment (UE) in a wireless communication system, the apparatus comprising:
   a hardware controller configured to identify first offset information and second offset information, and determine a size of uplink data for the UE; and
   a transmitter configured to transmit, to a base station in the wireless communication system, the uplink data with at least one of acknowledgement/non-acknowledgement (ACK/NACK) information and channel quality indicator (CQI) information on a physical uplink shared channel (PUSCH),
   wherein a number of symbols for the ACK/NACK information is determined based on the first offset information and the size of the uplink data, and
   wherein a number of symbols for the CQI information is determined based on the second offset information and the size of the uplink data.

6. The apparatus of claim 5, wherein the size of the uplink data is determined based on a modulation and coding scheme (MCS) assigned by the base station.

7. An apparatus in a base station in a wireless communication system, the apparatus comprising:
   a hardware controller configured to identify first offset information and second offset information, and determine a size of uplink data for a user equipment (UE) in the wireless communication system; and
   a receiver configured to receive from the UE, the uplink data with at least one of acknowledgement/non-acknowledgement (ACK/NACK) information and channel quality indicator (CQI) information on a physical uplink shared channel (PUSCH),
   wherein a number of symbols for the ACK/NACK information is determined based on the first offset information and the size of the uplink data, and
   wherein a number of symbols for the CQI information is determined based on the second offset information and the size of the uplink data.

8. The apparatus of claim 7, wherein the size of the uplink data is determined based on a modulation and coding scheme (MCS) assigned to the UE.

* * * * *